(No Model.)

T. E. BUCK.
JETTY FOR CORRECTING THE CHANNELS OF RIVERS, &c.

No. 275,132. Patented Apr. 3, 1883.

Attest:
Wm. F. Sayers
G. L. Wheelock

Inventor:
Thos. E. Buck
By Knight Bro.
attys.

N. PETERS, Photo-Lithographer, Washington, D. C.

UNITED STATES PATENT OFFICE.

THOMAS E. BUCK, OF ST. LOUIS, MISSOURI.

JETTY FOR CORRECTING THE CHANNELS OF RIVERS, &c.

SPECIFICATION forming part of Letters Patent No. 275,132, dated April 3, 1883.

Application filed January 13, 1883. (No model.)

*To all whom it may concern:*

Be it known that I, THOMAS E. BUCK, of the city of St. Louis, in the State of Missouri, have invented a certain new and useful Improvement in Jetties for Correcting the Channels of Rivers, &c., of which the following is a full, clear, and exact description, reference being had to the accompanying drawings, forming part of this specification, in which—

Figure 1:
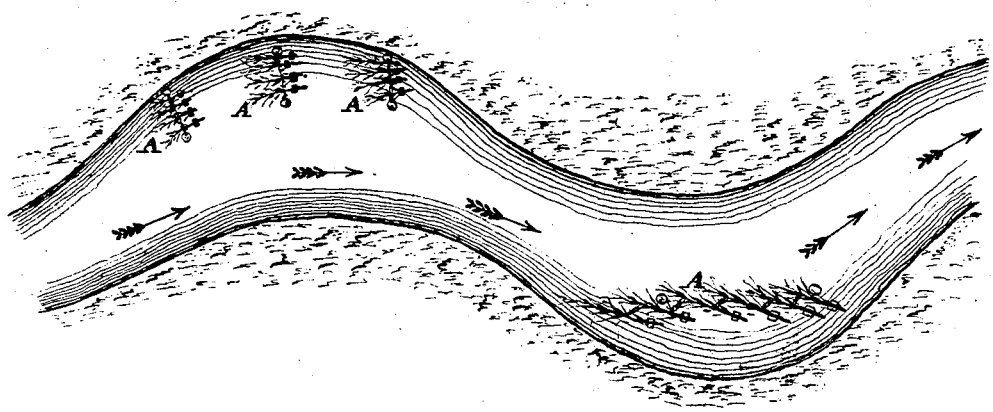
Figure 2:
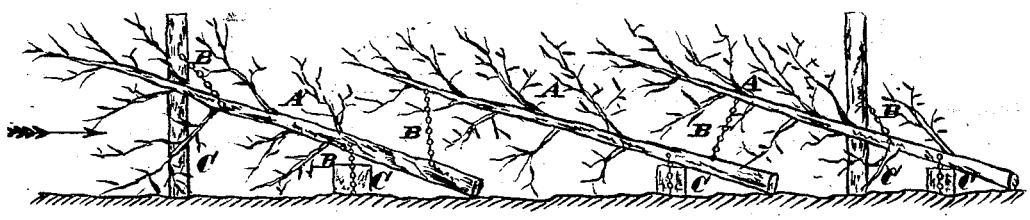

Figure 1 is a top or bird's-eye view, and Fig. 2 a side view.

My invention relates to a plan for correcting, widening, deepening, and confining the channels of rivers and streams; and my invention consists, broadly, in placing the branches of the trees up stream, as more fully described hereinafter.

Referring to the drawings, A represents trees anchored by means of chains B, or like fastenings, to piles or stones C, as shown in Fig. 2, with their branches pointing or projecting up stream. My preferred manner is to connect the trees together, as well as to the piles or stones, thus forming a chain of trees. These trees are secured, as before stated, in the narrow bends of rivers, and as they overlap each other a continuous bar is formed, which will prevent the water from washing farther into the bend and cause it to cut away the projection on the other side of the stream, and the stream, being thus confined, will deepen by washing out dirt in the bottom. By placing the trees with their branches projecting up stream they are continually more firmly embedded to the bottom of the river by the current striking the branches and by the driftsand settling around the trunks and branches.

Instead of securing the trees to piles and stones, as shown and described, they may be weighted down by means of stones or heavy weights; or they may be held in place by any suitable means. A single row or chain of trees may be used in each bend, as shown in Fig. 2 and on the left side of Fig. 1, or a series or number of said rows or chains may be used in each bend, as shown on the right side of Fig. 1, and in this latter case, the rows being a little distance apart, the sand is permitted to gather around the trunks and branches and gradually fill up the intervening spaces, and ultimately form a bank. Another advantage of placing the trees with their branches projecting up stream is that no fish-holes are formed, as is the case where the branches project down stream.

I claim as my invention—

1. In a jetty for correcting the channels of rivers, &c., one or more trees secured in the stream with the branches projecting up stream, for the purpose set forth.

2. In a jetty for correcting the channels of rivers, &c., two or more trees with their branches projecting up stream, and being fastened together and to anchors in the stream, substantially as set forth.

3. In a jetty for correcting the channels of rivers, &c., the combination, with the trees A, with their branches projecting up stream, and anchors C, made fast in the bottom of the stream, of the fastenings B, securing the trees together and to the anchors, all substantially as shown and described.

THOS. E. BUCK.

In presence of—
SAML. KNIGHT,
GEO. H. KNIGHT.